United States Patent
Milward

[15] 3,691,448
[45] Sept. 12, 1972

[54] AUTOMATIC BATTERY CHARGING SYSTEMS FOR A VARIABLE LOAD

[72] Inventor: Gilbert Harold Milward, North Baddesley, England

[73] Assignee: Bardic Systems Limited

[22] Filed: Oct. 7, 1970

[21] Appl. No.: 78,699

[30] Foreign Application Priority Data

Oct. 9, 1969 Great Britain......49633/69

[52] U.S. Cl...................................320/39, 320/43
[51] Int. Cl..................................................H02j 7/04
[58] Field of Search.............320/43, 44, 45, 39, 40; 307/66

[56] References Cited

UNITED STATES PATENTS

| | | | |
|---|---|---|---|
| 3,356,922 | 12/1967 | Johnston | 320/40 X |
| 2,957,117 | 10/1960 | Lapoyade | 320/43 X |
| 3,484,681 | 12/1969 | Grady, Jr. et al. | 320/44 X |
| 3,417,308 | 12/1968 | Mandel et al. | 320/39 X |

Primary Examiner—J. D. Miller
Assistant Examiner—Robert J. Hickey
Attorney—Watson, Cole, Grindle & Watson

[57] ABSTRACT

In an automatic battery charging system a small pilot cell is connected in the feedback circuit of an amplifier of which the input is proportional to both the direction and magnitude of the main battery current. Thus the pilot cell is charged at a rate proportional to the discharge of the main battery and vice versa, and so arranged to be partially charged when the main battery is fully discharged, and fully discharged when the main battery is fully charged, and in the latter condition the decreased voltage of the pilot cell causes the amplifier output to terminate or modify the charge. The charging current may be controlled by a transistor which also adjusts it to provide the load current if and when the supply is available.

3 Claims, 3 Drawing Figures

AUTOMATIC BATTERY CHARGING SYSTEMS FOR A VARIABLE LOAD

This invention relates to automatic battery charging systems including battery terminals for connection to a main secondary battery to be charged and discharged.

British Pat. No. 1,211,846 describes a battery charging system including battery terminals for connection to a main secondary battery to be charged and discharged, and control means for controlling the charging circuit including an auxiliary secondary battery (such as a small button cell) means for terminating or modifying the charging current when the voltage of the auxiliary battery falls below a predetermined value, and means for causing the auxiliary battery to be charged so long as the main battery is being discharged and vice versa.

With certain types of battery it has been possible to assess the amount of recharge required by measurement of the increase in terminal voltage during the charging period; where this rise in voltage is well defined it may be used to actuate devices to switch off the charging current, to continue it for a preset period, or to reduce it to a low trickle rate. On the other hand with other types of cell, especially those capable of being recharged without any gas evolution, the rise in voltage during charge is not well defined and is no longer suitable for actuating a device for terminating or modifying the charge.

The ability of such cells to absorb the gases, which normally would be evolved on charge, is limited by several factors, but principally by the charging current density per unit area of electrode plate, which is directly proportional to the current applied for recharging. Associated with current density, the period for which the current is applied and the state of charge of the cells are relevant factors. Thus, it is possible safely to apply a relatively high charging current to a discharged cell for a period sufficient to replace, for example, 80 percent of the previously discharged capacity. Alternatively or in addition, it is possible to apply a small charging current, such as is within the recombination capability of the cell, for an indefinitely long period without harm.

Cells of this type are now being used in increasing quantities for applications such as emergency lighting, domestic or industrial appliances etc. and it is usually desirable to effect recharging quickly so that the apparatus is ready for use again without undue delay. For example, it is sometimes desirable that emergency lighting batteries should be capable of being substantially recharged within a period of a few hours after use.

Various devices have been used to regulate recharging so that this may be carried out in an acceptable period of time without risk of damage to the cell. These have included timing devices, temperature or pressure sensitive elements and coulometer. These, however, are found to possess undesirable limitations or have proved to be unreliable in service due to variations in the behavior either of the cells being charged or of the devices themselves.

The present invention may be regarded as an improvement or modification of that set forth in the prior specification referred to above, and is characterized in that the rate at which the auxiliary battery is charged is substantially proportional to the rate at which the main battery is discharged. The rate at which the auxiliary battery is discharged may also be substantially proportional to the rate at which the main battery is charged.

Thus the arrangement described in the prior specification is intended for systems in which the main battery is connected to a constant load so as to be discharged at a constant rate as well as being charged at a constant rate. For this purpose while the main battery is being discharged the auxiliary battery is connected in series with a resistor connected in parallel with the main battery and with the constant load; while the main battery is being charged, the auxiliary battery is directly connected to a relay coil which takes a small discharging current from it. Clearly such an arrangement is not applicable if the load on the main battery is liable to vary widely.

The term relay is used herein, where the context permits, to include not only a mechanical relay or switch but also an amplifier or solid state switching device, or a combination of these.

It would, of course, be possible to connect the auxiliary battery in parallel with a resistor in series with the main battery. This, however, would not satisfy the condition referred to above, namely that the rate at which the auxiliary battery is charged is substantially proportional to the rate at which the main battery is discharged. Thus, assuming that the auxiliary battery is charged at a certain maximum rate when the main battery is discharged at a certain maximum rate, then reduction in the discharge rate of the main battery would proportionately reduce the voltage applied to the auxiliary battery, but a comparatively small reduction in this voltage would reduce the charging current of the auxiliary battery to zero, and a slight further reduction would cause the auxiliary battery to discharge through the resistor. For example it might well be that if the main battery discharge current were reduced to half its maximum value, the charging current of the auxiliary battery, instead of being halved, would be replaced by a substantial discharge current.

Accordingly the arrangement would not achieve its purpose and indeed would be inoperative.

A further disadvantage of such an arrangement would be that, irrespective of current values, it would reduce the effective voltage of the main battery by an amount equal to the voltage of the auxiliary battery on charge, thus in effect more than nullifying a complete cell of the main battery (in the case of equal volts per cell) however large the capacity of the main battery.

By employing an amplifier, the sensing device need only introduce a negligible voltage drop in the main battery circuit.

In a preferred form of the invention the control means include sensing means for sensing the magnitude and direction of the main battery current, the voltage drop introduced in the battery circuit by such means being less than the voltage of the auxiliary battery, and control means including an amplifier controlled by the sensing means for causing the auxiliary battery to be charged from the main battery while the latter is being discharged, and discharged while the main battery is being charged, the auxiliary battery discharging current being proportional to the main battery charging current.

Conveniently the auxiliary battery is connected in the feedback circuit of a high-gain operational amplifier having applied to its input a voltage proportional in magnitude and sign to the main battery current and having its output arranged to control the charging current.

In a preferred arrangement the control means include a level responsive trigger circuit, such for example as a Schmitt circuit, which may or may not control an electromechanical relay.

Further features of the invention will be apparent from the following description of specific embodiments that will be given by way of example with reference to the accompanying drawings in which.

Figure 1:
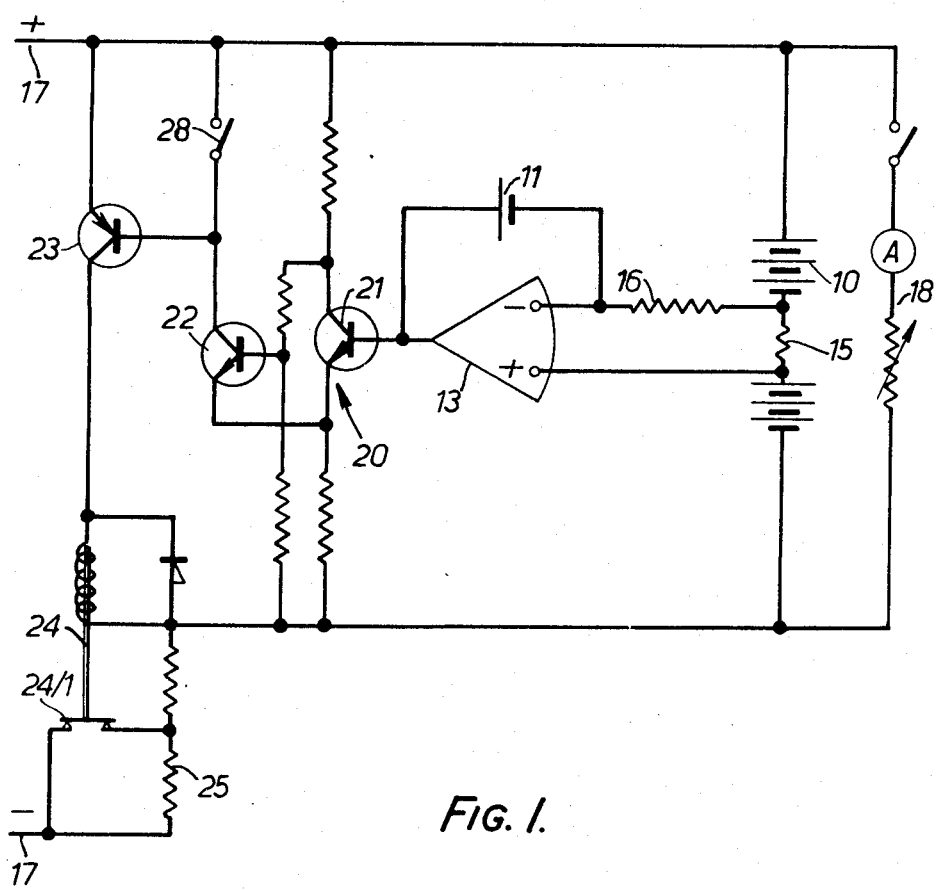
FIG. 1 is a circuit diagram of an automatic battery charging system.

In the embodiment shown in FIG. 1 the invention is applied to a charging system having means for recording the capacity in ampere hours which is taken from the main battery 10 by a variable load or loads and producing an unambiguous signal when an equal, or proportional, capacity has been returned to the battery, for example so as to terminate the charge, or reduce the charging current to a trickle value.

The arrangement incorporates a high-gain operational amplifier 13 having a differential input. The amplifier may be of the monolithic integrated circuit type and has in its feedback circuit an auxiliary battery 11. The term battery is used herein where the context permits to include a single cell and in the present case the auxiliary battery 11 is preferably of the button or sealed sintered plate type. A small series resistor 15 is connected in series with the main battery and the input of the amplifier is connected across it through an input resistor 16. The resistance of the series resistor 15 is such as to dissipate negligible power. For example it may be constituted by an ammeter or ammeter shunt. The main battery is arranged to be connected to a charging circuit 17 and to a load circuit 18 so that both the charging current and the load current pass through the series resistor 15.

The series resistor 15 and the auxiliary cell 11 are so connnected to the amplifier 13 that the auxiliary cell will be charged while the main battery 10 is being discharged and vice versa.

The output of the amplifier is supplied to a level-responsive trigger circuit 20 such for example as a Schmitt circuit comprising a pair of transistors 21 and 22. The trigger circuit controls a transistor 23 in series with a mechanical relay 24 the relay having contacts 24/1 in series with the charging circuit. Such contacts may be shunted by a resistor 25 so that the arrangement provides for a rapid charge to make good the capacity withdrawn by a load, followed by a trickle charge at a low rate which may be continued indefinitely without damage to the main battery.

Thus in operation the voltage applied to the input resistor 16 of the operational amplifier 13 is proportional in both magnitude and sign to the current in the main battery circuit, whether charging or discharging. In accordance with known practice the gain of the operational amplifier is sufficiently high to ensure that its input terminal is substantially a virtual ground, the input current to the amplifier itself being negligible, so that virtually the whole of the input current through the input resistor is accepted by the feedback circuit. Accordingly the voltage across the series resistor 15 is proportional to the charging or discharging current of the main battery; the current through the input resistor 16 is also proportional to the battery current; and hence the current in the feedback circuit, that is to say the current through the auxiliary cell 11, is also proportional to battery current. Similarly the output voltage of the amplifier is exactly equal to the voltage of the auxiliary cell and it is this voltage which is applied to the trigger circuit 20.

The only significant step in the voltage-time characteristic of the auxiliary cell appears when the cell is substantially discharged (below 1.10 volts). Its voltage then falls rapidly and the trigger circuit is arranged to respond when the voltage falls below say 0.25 of a volt so as to actuate the relay (conveniently energizing the relay having a normally closed contact in the charging circuit).

When the main battery is again being discharged, the feedback current reverses and charges the auxiliary cell. The magnitude of the feedback current and the capacity of the cell are chosen so that during discharge of the battery the auxiliary cell does not receive more than about half of its rated capacity, since in this region of the cell's characteristic the charge efficiency is substantially 100 percent, so that the state of charge of the main battery is accurately registered by the auxiliary cell at all times.

When first installed the controller requires the closing of a manual conditioning switch 28 closing a bypass circuit for de-energizing the relay 24. After a predetermined period of high charge rate this switch is opened manually and thereafter the auxiliary cell registers any discharge current (whether the charging supply is present or not) and if required signals for an automatic quick recharge, which is self-terminated as described above.

If the charger being used has means, other than a series resistor, for controlling the boost charge current, then the relay contact would control by this means.

It is generally desirable that the power supply for the amplifier 13 and relay 24 should be provided by the main battery itself so as to avoid the necessity for providing a further battery to maintain operation if the supply should fail or when the main battery is disconnected from the supply (as in the case of a vehicle or portable appliance). Moreover it is generally required that the input terminal to the operational amplifier should be at a voltage level intermediate between the positive and negative terminals of the battery. In the arrangement of FIG. 1 this is ensured by dividing the main battery 10 into two portions and placing the small series resistor 15 in the connection between the two portions.

In some cases this may be inconvenient, for example when the battery is of monoblock type, or when it is not convenient to provide connections and cables to it beyond those connected to its two terminals.

Figure 2:
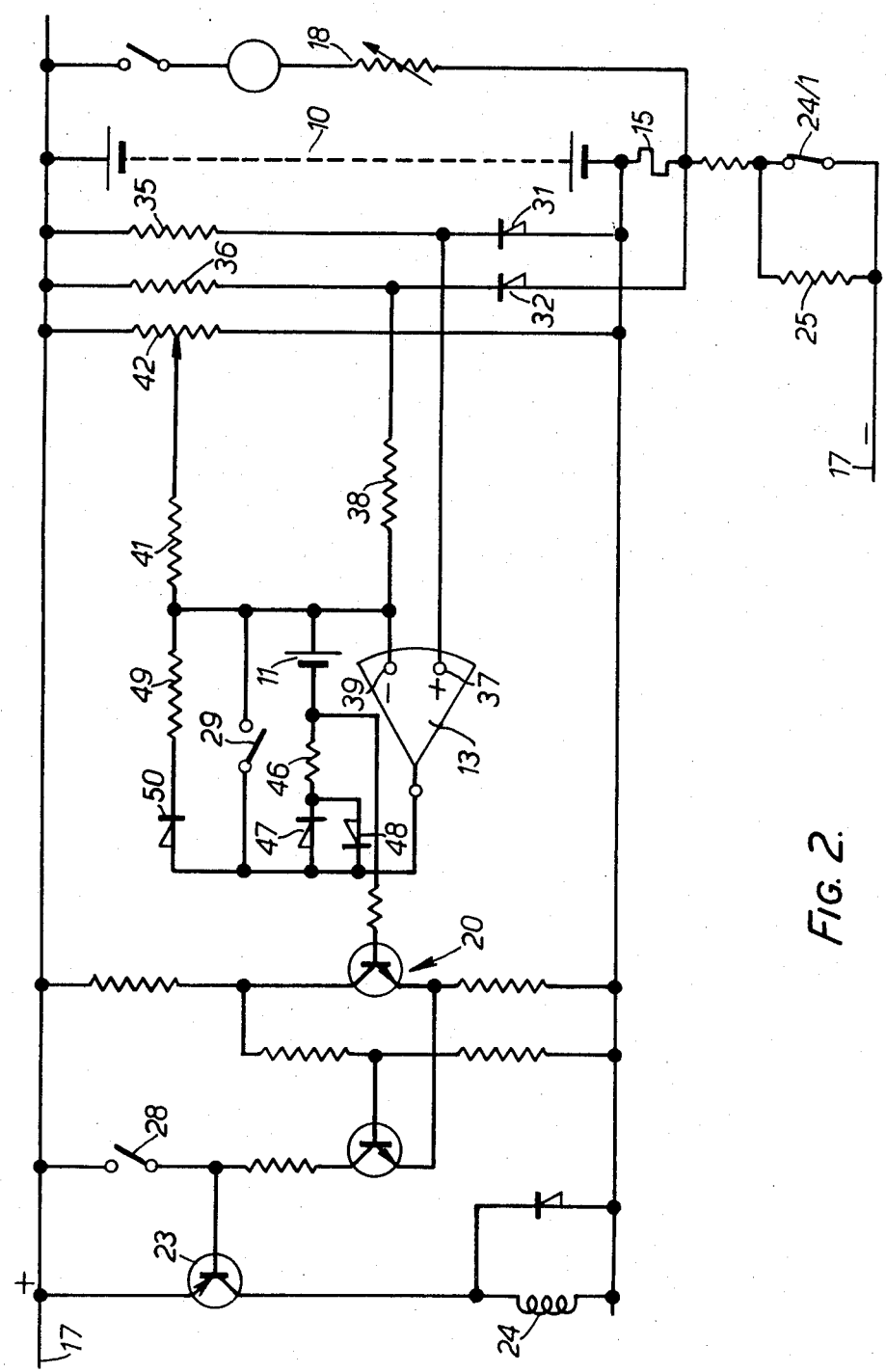
FIGS. 2 and 3 are circuit diagrams, similar to that shown in FIG. 1, of modified systems.

The arrangement shown in FIG. 2 eliminates the necessity to split the battery and in addition it provides for a total charge capacity in excess of the total discharge capacity.

In general the arrangement of FIG. 2 is similar to that of FIG. 1 and like parts bear the same reference numerals. The small series resistor 15, however, is connected in series with the negative lead of the battery 10 and its two ends are connected respectively through zener diodes 31 and 32 and resistors 35 and 36 to the positive terminal. The junction between the zener diode 31 and the resistor 35 is connected to one input terminal 37 of the amplifier, and the junction between the zener diode 32 and the resistor 36 is connected through a resistor 38 to the other input terminal 39. The latter input terminal is also connected through a resistor 41 to the tapping of a potentiometer 42 connected across the battery terminals in order to balance out any inequality between the two zener diodes due to production tolerance. Accordingly the arrangement is adjusted so that when the charging current is zero, and hence there is no potential difference across the resistor 15, there will be no difference of voltage between the two input terminals of the amplifier.

In addition the feedback circuit, in series with the auxiliary cell 11, includes a resistor 46 and a pair of opposed parallel diodes 47 and 48. These (including the auxiliary cell) are shunted by a resistor 49 in series with a diode 50. The latter serves to bypass a proportion of the feedback current so as not to pass through and tend to discharge the auxiliary cell while the main battery is being charged, but does not bypass any current in the opposite direction while the main battery is being discharged and the auxiliary cell charged. Hence the duration of charge is greater than that of discharge. In addition the feedback circuit is shunted by a contact 29 of the conditioning switch 28 so as to prevent overdischarge of the auxiliary cell during the initial charge under manual control when the arrangement is first installed.

The resistor 46 and the diodes 47 and 48 are necessary to force up the output voltage of the amplifier 13, so that on discharge of the auxiliary battery 11, the feedback current is shared in the desired ratio between the auxiliary battery 11 and the resistor 49. If the amplifier output is substantially the same as the terminal voltage of the battery 11, no such sharing will take place because of the non-linearity of the characteristic of the diode 50.

Figure 3:
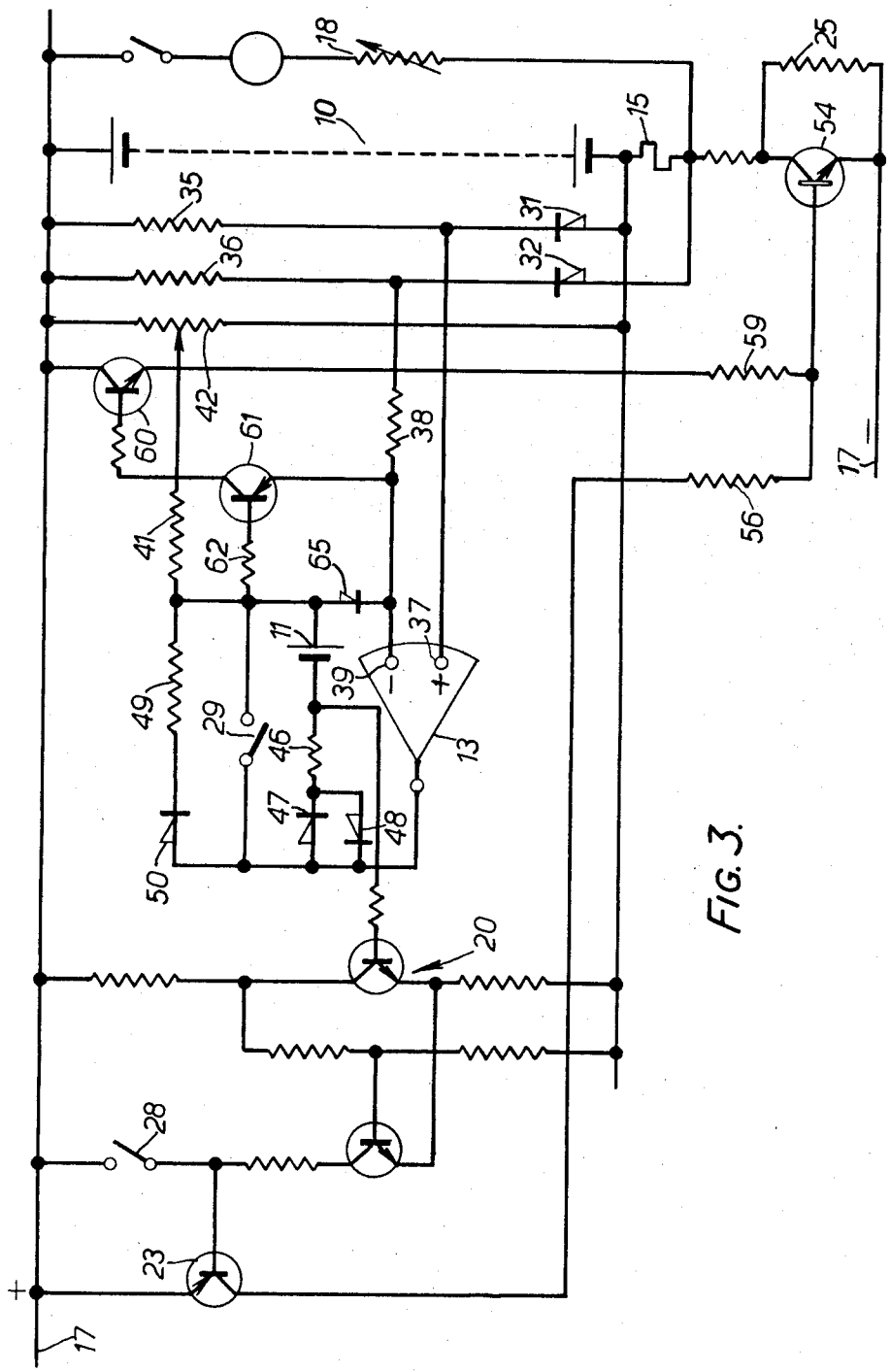

FIG. 3 shows an arrangement generally similar to that of FIG. 2 but designed to supply a continuous and varying load as far as possible from the D.C. mains supply 17. Thus the relay 24 is replaced by a transistor 54. The base of this transistor is connected through a resistor 56 to the collector of the transistor 23 so as to operate in manner precisely analagous to the relay 24 of FIG. 2. In addition the base of the transistor 54 is connected through a resistor 59 to a transistor 60 whose base is controlled by a transistor 61 having its emitter connected to one input terminal 39 of the operational amplifier 13 and its base connected through a resistor 62 to the junction of the resistors 41 and 49 which is now seperated from the said input terminal 39 by a diode 65.

When the main battery 10 is on discharge, signal current flows through the resistor 38, the base/emitter junction of the transistor 61, the resistor 62 and the auxiliary battery 11. In addition to registering main battery discharge capacity, this causes the transistors 61, 60 and 54 to conduct, thus tending to cause the load to be met from the mains supply, and to reduce the net discharge of the main battery, and the signal current, to zero. However, if no supply is available, the battery discharge current equals the load current and this is registered by the auxiliary battery 11.

So long as the auxiliary cell 11 is fully discharged the feedback current acting on the transistors 61 and 60 will maintain the transistor 54 at a trickle charge rate but if any charge remains in the auxiliary cell due to a previous net discharge of the main battery the transistors 60 and 61 will cause the transistor 57 conduct to a greater extent to provide a boost charge.

It will be noted that the resistor 15 is not included in the circuit connecting the load to the mains supply.

Accordingly the load will be supplied from the charger when the load current is within the capability of the charger. If the load current exceeds the capability of the charger it will be shared between the charger and the battery, and if the mains supply should fail the load will be supplied from the battery.

In larger installations the supply would be controlled not by a transistor such as the transistor 54 but by a transductor or a silicon controlled rectifier bridge in the a.c. supply. Control of these would then be by means of the transistor 54 controlling a current in the governing circuit of the transductor or the silicon controlled rectifier bridge supply unit to give a d.c. current varied linearly by the transistor 60, stepwise by the transistor 23 and limited to a safe maximum by the normal current limiting mechanism of the supply unit.

What we claim as our invention and desire to secure by Letters Patent is:

1. An automatic battery charging system for charging a main secondary battery, comprising:

a charging circuit for producing charging current;

means for controlling said charging circuit including an auxiliary secondary battery;

means for modifying said charging current when the voltage of said auxiliary battery falls below a predetermined value;

said means for controlling further including means for sensing the magnitude and direction of the main battery current, said means for sensing having a voltage drop less than the voltage of said auxiliary battery;

means including an amplifier controlled by said sensing means for charging said auxiliary battery from said main battery as said main battery is being discharged and for discharging said auxiliary battery as said main battery is being charged, the auxiliary battery discharging current is proportional to the main battery charging current; wherein said amplifier is a high-gain operational amplifier having a feedback circuit and an output for controlling said charging current and said auxiliary battery is connected in said feedback circuit and said means for sensing provides a voltage proportional in magnitude and sign to the main battery current to the input of said high-gain operational amplifier.

2. An automatic battery charging system as in claim 1 further comprising a by-pass circuit including a diode, said by-pass circuit shunts said feedback circuit and said auxiliary battery.

3. An automatic battery charging system as in claim 2 wherein said feedback circuit further includes a pair of reversed parallelly connected diodes for balancing the forward drop of said diode in said by-pass circuit.

* * * * *